Patented Dec. 4, 1934

1,982,765

UNITED STATES PATENT OFFICE 1,982,765

ARTIFICIAL MASS

Curt Schönburg, Bitterfeld, Germany, assignor to I. G. Farbenindustrie Aktiengesellschaft, Frankfort-on-the-Main, Germany No Drawing. Application May 9, 1933, Serial No. 670,213. In Germany May 23, 1932

7 Claims. (Cl. 260—2)

There has not hitherto been obtained by any of the numerous processes proposed for polymerizing vinyl chloride products which unite a sufficient degree of solubility with sufficient strength. Hence the artificial masses made from a basis of polymerized vinyl chloride have not found any extended use in the industries concerned.

This invention relates to a process in which by chlorination of a polymerized vinyl chloride, obtained in any manner, an artificial mass is obtainable having a strength essentially higher than that of the product made from the polymerized vinyl halide which has not been halogenated. Whereas, therefore, it has hitherto been necessary to produce a polymerization as far-reaching as possible in order to attain a high degree of strength and thereby to sacrifice solubility, it is now possible to produce by an after-chlorination of, for example, a polymerized vinyl chloride of a low degree of polymerization having indeed good solubility but exhibiting little or no tendency to form films in consequence of its insufficient tenacity, a product which is suitable for making highly valuable films, lacquers, sheets or threads.

The enhanced mechanical strength of the product due to the halogenation renders possible a depolymerization leading to a further improved solubility and a lower flowing temperature of the product, while retaining sufficient strength; this is of importance in the preparation of sheets, or masses produced by spraying and pressing. It is also possible to subject, according to this invention, to a partial chlorination highly polymerized products, obtained in any known manner, which are of great strength but of unfavorable solubility, and at the same time (for example by halogenation at a raised temperature) or subsequently to de-polymerize the product in known manner. By such a union of halogenation and depolymerization there can be obtained intermediate stages from products of low degree of polymerization and of good solubility but of poor mechanical strength and from products of high degree of polymerization and poor solubility but of good mechanical strength, which intermediate products are suitable for any purpose requiring particular degrees of solubility and strength.

By the chlorination of previously polymerized vinyl chloride, new bodies are produced, of which the chemical constitution is not yet clear. It may be stated, however, that the halogen introduced cannot be eliminated by saponification with alkalies without other treatment. Since analogous cases do not exist, the possibilities of the chlorination of previously polymerized halide and the peculiar effect thereof must be considered as surprising.

An advantageous procedure according to the invention consists in subjecting to the action of chlorine a polymerized vinyl chloride, obtained in any desired manner, in a sutiable solvent or swelling agent, for instance, carbon tetrachloride or tetrachlorethane; an elimination of hydrogen chloride is to be observed. When the halogenation has proceeded to a desired degree the product is separated from the solvent. This can be done in known manner, for example by distilling the solvent, if desired, with fine subdivision of the solution, or by precipitation by means of a suitable agent, for instance, an alcohol, the precipitate being separated from the mixture in mechanical manner, namely by filtration or centrifuging. The depolymerization may be produced as desired, during or after the halogenation, by heating the solution, the temperature depending on the boiling point of the solvent, and the duration of heating on the desired degree of depolymerization.

The product is a white pulverulent mass, useful in the making of artificial materials of many kinds, such as films, lacquers, impregnating agents, insulating materials, moulded and sprayed masses, wrapping sheets and the like. The outstanding features of the products are their complete insensitivity towards water, alcohols, ether and benzine and, in the case of films, their stability at low temperatures (—10° C.), as well as their incombustibility. By the addition of softening agents, such as a phosphoric acid ester, a phthalic acid ester, castor oil or linseed oil, the extensibility is affected in favorable manner; also coloring and filling agents may be added to the mass.

The following examples illustrate the invention, the parts being by weight:—

*Example 1.*—100 parts of a polymerized vinyl chloride of low polymerization and soluble to the extent of about 10 per cent in butyl acetate, which polymerized vinyl chloride is obtainable by polymerizing vinyl chloride in an autoclave in the presence of benzoyl peroxide and acetic anhydride at 60° C. and which in consequence of insufficient strength cannot be used for producing a varnish film, are suspended in 2000 parts of carbon tetrachloride and chlorine is introduced into the suspension at 60 to 70° C. After a test portion shows that the product has good film forming properties, the chlorination is interrupted, the liquid, after cooling, is mixed with 600 parts of methanol and is then filtered from the precipitated chlorination product. Finally, the solid matter is washed with methanol until free from acid and then dried. The white powder contains 64 to 66 per cent of chlorine and is soluble, to the extent of about 25 per cent in butyl acetate, a mixture of acetone and benzene and in ethylene chloride. The films obtained from such solutions have a tensile strength of 5 to 6 kilos per sq. mm.

*Example 2.*—100 parts of a highly polymerized vinyl chloride, almost insoluble in the usual solvents, which has been obtained according to the method described in Example 1, but at a temperature of only 35 to 40° C., are dissolved in 2500 parts of tetrachlorethane at 70 to 80° C. and thereupon chlorine is introduced, the temperature being raised to 100° C. After development of hydrogen chloride has ceased steam is blown into the solution, preferably under diminished pressure, until the whole of the tetrachlorethane has been removed and recovered. The chlorination product remaining in the still is dried in a vacuum. It is a white powder, which dissolves to the extent of about 30 per cent in the solvents named in Example 1, and has a chlorine content of 68 per cent. The films obtained from it have a tensile strength of about 7 kilograms per sq. mm. and an elongation of 4 to 5 per cent.

It is obvious that my invention is not limited to the foregoing examples or to the specific details given therein. Thus, for instance, the chlorination may be carried out in other liquid media than those mentioned in the foregoing examples, such as halogenated aromatic hydrocarbons, which either dissolve the polymerized vinyl chloride or act as a swelling agent upon the latter. Preferably, such media are chosen which do not react with chlorine under the conditions maintained during halogenation of the vinyl chloride polymerization product. The chlorination may be accelerated by addition of one of the well known chlorination catalysts, such as ferric chloride, aluminium chloride or iodine. Depolymerization may be carried out, if necessary, in a one-stage process during chlorination or in a separate process after separation of the chlorinated material. Generally, it may be stated that a better solubility and a better mechanical strength of the polymerization products already are gained when the chlorine content of the endproduct is raised to about 57 to 58%. Products having a chlorine content of 70% and more, are likewise obtainable, they likewise have a widely improved mechanical strength, the solubility in organic solvents, however, is somewhat diminished when compared with those having a chlorine content of 64 to 68 per cent. Preferably, chlorination is carried out in such an extent that the total content of chlorine in the endproduct is about 64 to 66 per cent.

These modifications and changes in details of chlorination and depolymerization are considered to be within the spirit of the invention and the scope of the following claims.

What I claim is:—

1. The process which comprises treating polymerized vinyl chloride in the presence of an organic solvent or swelling agent with chlorine.

2. The process which comprises treating polymerized vinyl chloride in the presence of a chlorinated aliphatic hydrocarbon with chlorine.

3. The process which comprises treating polymerized vinyl chloride in the presence of an organic solvent or swelling agent with chlorine, until the dried polymerization product contains 64 to 66 per cent of chlorine.

4. The process which comprises treating polymerized vinyl chloride in the presence of an organic solvent or swelling agent with chlorine, and depolymerizing the chlorinated polyvinyl chloride.

5. The process which comprises treating polymerized vinyl chloride in the presence of an organic solvent or swelling agent with chlorine at a temperature up to about 100° C.

6. A polymerized vinyl chloride having a chlorine content higher than 57 per cent and up to about 70 per cent, being soluble to the extent of about 20 per cent to 30 per cent in butyl acetate, a mixture of acetone and benzene, and in ethylene chloride, and forming films having a tensile strength of 5 to 7 kilos per sq. mm.

7. A polymerized vinyl chloride having a chlorine content from 64 to 66 per cent, being soluble to the extent of about 25 per cent in butyl acetate, a mixture of acetone and benzene and in ethylene chloride and forming films having a tensile strength of 5 to 6 kilos per sq. mm.

CURT SCHÖNBURG.